United States Patent
Cheng

(10) Patent No.: US 10,896,113 B2
(45) Date of Patent: Jan. 19, 2021

(54) METHOD FOR IMPLEMENTING BACKPLANE LIGHTING FOR MULTIPLE NVME HARD DISKS

(71) Applicant: ZHENGZHOU YUNHAI INFORMATION TECHNOLOGY CO., LTD., Henan (CN)

(72) Inventor: Shichao Cheng, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 0 days.

(21) Appl. No.: 16/493,244

(22) PCT Filed: Jun. 19, 2018

(86) PCT No.: PCT/CN2018/091776
§ 371 (c)(1),
(2) Date: Sep. 11, 2019

(87) PCT Pub. No.: WO2019/062218
PCT Pub. Date: Apr. 4, 2019

(65) Prior Publication Data
US 2020/0117568 A1    Apr. 16, 2020

(30) Foreign Application Priority Data

Sep. 27, 2017 (CN) .......................... 2017 1 0892197

(51) Int. Cl.
*G06F 11/32* (2006.01)
*G06F 1/18* (2006.01)
*G06F 11/30* (2006.01)

(52) U.S. Cl.
CPC ............ *G06F 11/325* (2013.01); *G06F 1/187* (2013.01); *G06F 11/3037* (2013.01); *G06F 11/327* (2013.01)

(58) Field of Classification Search
CPC .... G06F 11/325; G06F 1/187; G06F 11/3037; G06F 11/327
See application file for complete search history.

(56) References Cited

U.S. PATENT DOCUMENTS

| 8,830,611 | B1 * | 9/2014 | Chen ................. G06F 11/325 360/31 |
| 2013/0103864 | A1 * | 4/2013 | Yang ................. G06F 11/328 710/57 |

(Continued)

FOREIGN PATENT DOCUMENTS

| CN | 105487959 A | 4/2016 |
| CN | 105955898 A | 9/2016 |

(Continued)

OTHER PUBLICATIONS

International Search Report for PCT/CN2018/091776 dated Sep. 10, 2018, ISA/CN.

*Primary Examiner* — Tim T Vo
*Assistant Examiner* — Phong H Dang
(74) *Attorney, Agent, or Firm* — Yue (Robert) Xu; Apex Attorneys at Law, LLP

(57) ABSTRACT

A method for lighting a backplane lamp of multiple NVMe hard disks is provided. The method includes: transmitting a VPP address to the backplane in a cyclic manner by the controller, and analyzing the address transmitted by the controller by a programmable logic device of the backplane after a data stream transmitted by the controller is received; transmitting, by the controller, hard disk lamp lighting information of a corresponding disk position to the programmable logic device of the backplane, if a VPP address analyzed by the backplane is the same as the VPP address transmitted by the controller; and performing logical conversion on the hard disk lamp lighting information, to convert a serial data stream on the VPP signal wires into a (Continued)

parallel signal, lighting a backplane lamp at a corresponding port, and uploading information of a position of the hard disk to the controller.

7 Claims, 3 Drawing Sheets

(56) References Cited

U.S. PATENT DOCUMENTS

| | | | |
|---|---|---|---|
| 2014/0006603 A1* | 1/2014 | Yang | G06F 11/324 |
| | | | 709/224 |
| 2015/0149684 A1* | 5/2015 | Dhandapani | G06F 13/4072 |
| | | | 710/313 |
| 2017/0161137 A1* | 6/2017 | Wang | G06F 11/0772 |
| 2017/0161165 A1* | 6/2017 | Wang | G06F 11/327 |
| 2017/0168964 A1 | 6/2017 | Kung et al. | |
| 2017/0329736 A1* | 11/2017 | Yu | G06F 13/1668 |

FOREIGN PATENT DOCUMENTS

| | | |
|---|---|---|
| CN | 107038105 A | 8/2017 |
| CN | 107729220 A | 2/2018 |

* cited by examiner

METHOD FOR IMPLEMENTING BACKPLANE LIGHTING FOR MULTIPLE NVME HARD DISKS

The present application is a National phase application of PCT international patent application PCT/CN2018/091776, filed on Jun. 19, 2018 which claims the priority to Chinese Patent Application No. 201710892197.8, titled "DESIGN METHOD FOR IMPLEMENTING BACKPLANE LIGHTING FOR MULTIPLE NVME HARD DISKS", filed on Sep. 27, 2017 with the Chinese Patent Office, both of which are incorporated herein by reference in their entireties.

FIELD

The present disclosure relates to the technical field of a server hard disk backplane, and particularly to a method for lighting a backplane lamp of multiple NVMe hard disks.

BACKGROUND

As the performance of the CPU and graphics card improves continuously, the computing bottleneck of the server is caused by the storage device. Accordingly, the storage technology is upgraded. The hard disk transmission rate is increased from 6 GT/s to 12 GT/s, and is further increased to 24 GT/s. Based on the original SATA and SAS mechanical hard disks, new hard disk types appear, such as SATAe, M.2 and Non-Volatile Memory Express (NVMe). The mainstream hard disk is upgraded from the original mechanical hard disk to solid state drives (SSD). Under such circumstance, a higher requirement is put forward on the compatibility of the server hard disk backplane. The mainstream computing server backplane generally supports mixed plug of SATA, SAS and NVMe hard disks, and is equipped with PCIe, SATA and M. 2 as system disks. However, the old generation of server hard disk backplane mainly supports SATA and SAS hard disks, and the pin definition of the connector follows the SFF-8643 interface standard.

The existing hard disk backplane design solution mainly implements lamp lighting for SAS and SATA hard disks. This lamp lighting mode mainly depends on the Serial General Purpose Input/Output (SGPIO) signal sent by a master end. SGPIO is a serial bus that does not distinguish device addresses. A group of signals can light multiple hard disk indicator lamps. In addition, the existing hard disk backplane does not support SFF-8639, that is, the downlink connector does not define the in-band signal pin of the NVMe hard disk. In addition, the SFF-8643 does not define that the CPU transmits the VPP signal for the hard disk lamp lighting. Therefore, the existing SAS and SATA backplane does not support the lamp lighting function of the NVMe hard disk.

For the existing NVMe hard disk backplane, the NVMe error information is obtained by the Baseboard Management Controller (BMC) by reading the I2C channel of the Field Replace Unit (Fru). The lamp lighting state indication is unstable, and the Locate indicator lamp cannot be lit up normally because the positioning indication signal for the hard disk cannot be obtained. Therefore, the complete hard disk lamp lighting function of the NVMe cannot be realized.

SUMMARY

A method for lighting a backplane lamp of multiple NVMe hard disks is provided. A backplane is connected to a motherboard, a group of VPP signal wires are connected to each controller of the motherboard, and the VPP signal wires are connected to the backplane via a connector sideband channel of each port. The method includes:

transmitting a VPP address to the backplane in a cyclic manner by the controller, and analyzing address information transmitted by the controller by a programmable logic device of the backplane after a data stream transmitted by the controller is received;

transmitting, by the controller, hard disk lamp lighting information of a corresponding disk position to the programmable logic device of the backplane, if a VPP address analyzed by the backplane is the same as the VPP address transmitted by the controller; and performing logical conversion, by the programmable logic device of the backplane, on the hard disk lamp lighting information, to convert a serial data stream on the VPP signal wires into a parallel signal, lighting a backplane lamp at a corresponding port and uploading information of a position of the hard disk monitored by the backplane to the controller by the programmable logic device.

BRIEF DESCRIPTION OF THE DRAWINGS

For explaining technical solutions according to embodiments of the present disclosure clearer, drawings used in the illustration of the embodiments are described briefly hereinafter. Apparently, the drawings in the following description show merely some embodiments of the present disclosure, and other drawings may be obtained based on these drawings by those skilled in the art without any creative effort.

DETAILED DESCRIPTION OF THE EMBODIMENTS

In order to make the objects, technical solutions and advantages of the present disclosure clearer, the present disclosure is further described in detail below with reference to the drawings and embodiments. It should be understood that the specific embodiments described herein are used only to explain the present disclosure and are not intended to limit the present disclosure.

In order to facilitate the understanding of the technical solutions of the present disclosure, English abbreviations involved in the method are explained and described as follows.

NVMe: Non-Volatile Memory Express;
SSD: Solid State Drive;
PCIe: Peripheral Component Interconnect Express;
Tri-mode card: New generation of RAID card which can support a NVMe hard disk format;
VPP: Virtual Pin Port;
BMC: Baseboard Management Controller.

Figure 1:
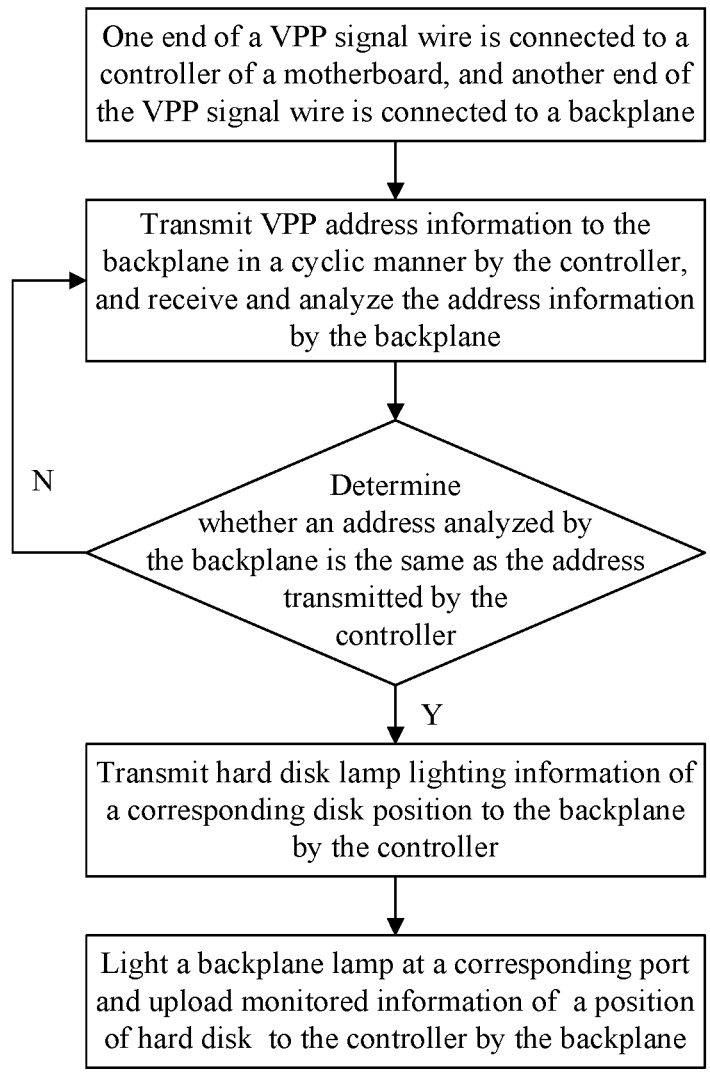
FIG. 1 is a flow chart of a method for lighting a backplane lamp of multiple NVMe hard disks according to an embodiment of the present disclosure.

As illustrated in FIG. 1, a method for lighting a backplane lamp of multiple NVMe hard disks is provided according to the present disclosure. A backplane is connected to a motherboard, a group of VPP signal wires are connected to each controller of the motherboard, and the VPP signal wires are connected to the backplane via a connector sideband channel of each port. The method includes following steps:

transmitting a VPP address to the backplane in a cyclic manner by a controller, and analyzing the address transmitted by the controller by a programmable logic device of the backplane after a data stream transmitted by the controller is received;

transmitting hard disk lamp lighting information of a corresponding disk position to the programmable logic device of the backplane by the controller, if a VPP address analyzed by the backplane is the same as the VPP address transmitted by the controller; and performing logical conversion, by the programmable logic device of the backplane, on the hard disk lamp lighting information transmitted by the controller, to convert a serial data stream on the VPP signal wires into a parallel signal, and lighting a backplane lamp at a corresponding port and uploading information on a position of the hard disk monitored by the backplane to the controller by the backplane.

Figure 2:
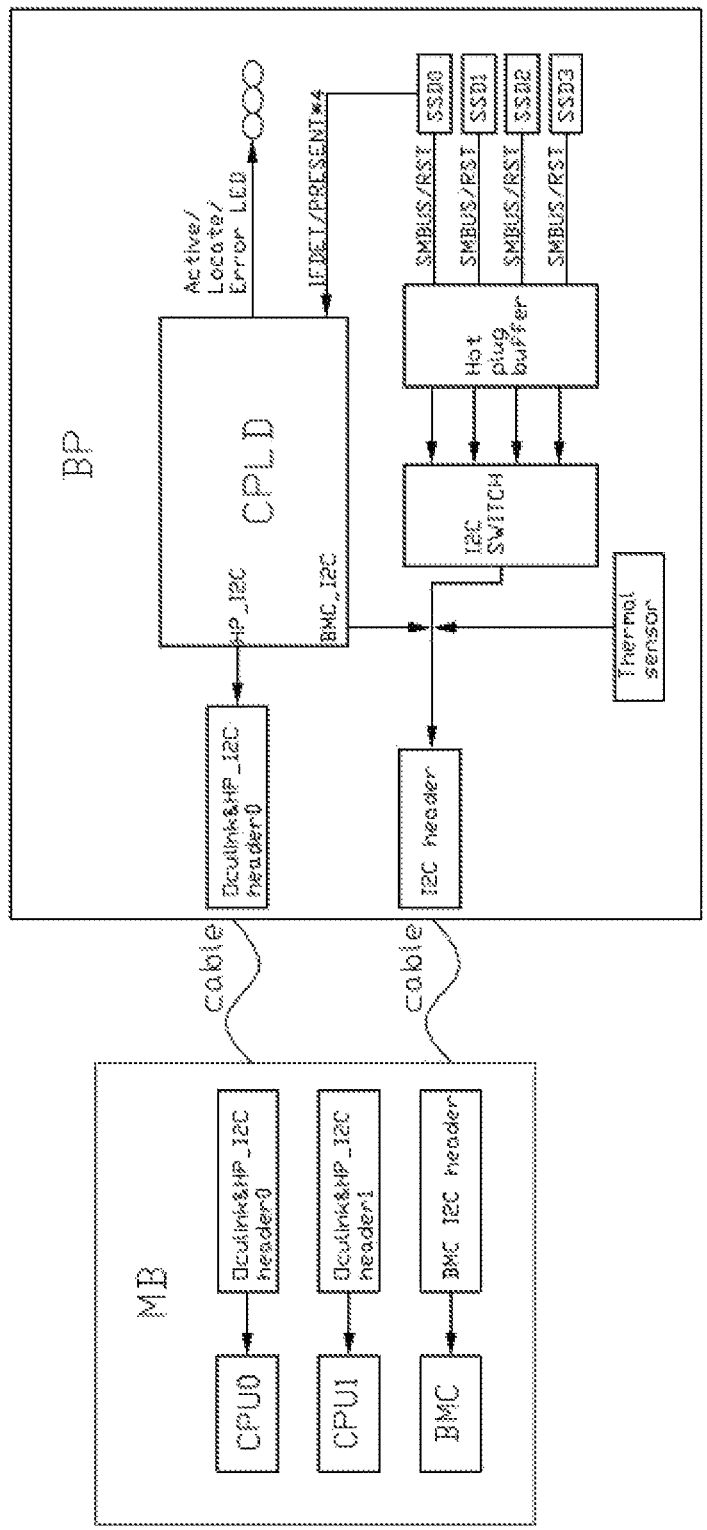
FIG. 2 is an interconnection topological graph according to an embodiment of the present disclosure.
Figure 3:
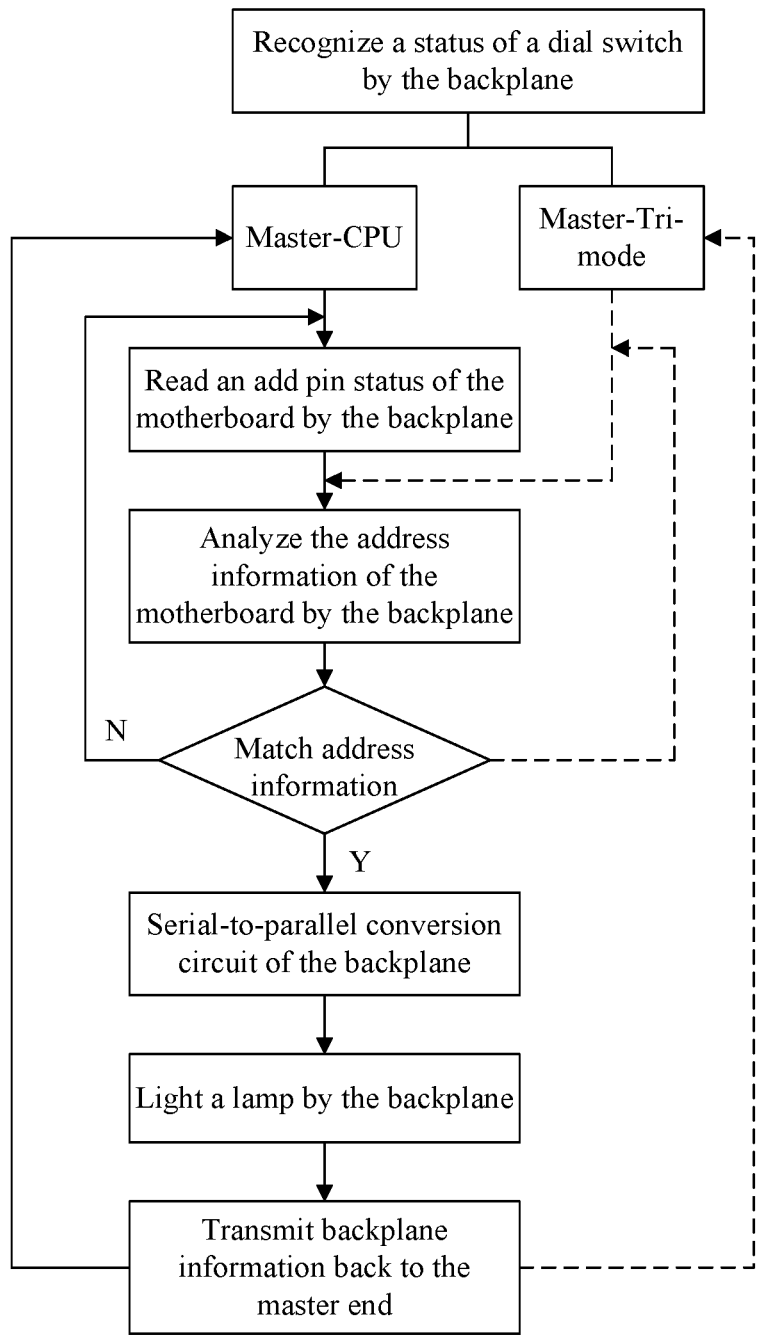
FIG. 3 is a work flow chart of a method for lighting a backplane lamp of multiple NVMe hard disks according to an embodiment of the present disclosure.

As illustrated in FIGS. 2 and 3, in order to achieve flexible configuration of multiple NVMes, CPU0, CPU1 and Tri-mode can serve as uplink controllers of the NVMe for the same machine type. An Oculink connector serves as a connector of the backplane, a reserved signal pin on the Oculink connector serves as an address line, each port address is defined through an up-down pull resistor at the motherboard end. The address line information is read and the VPP address is allocated for a corresponding channel after the address line information is analyzed by the backplane. In addition, the backplane is provided with a dial switch, a status list of the dial switch is determined by configuration of each NVMe. The programmable logic device of the backplane determines a type of the uplink controller, a channel for interacting with the controller, and the number of NVMe hard disks based on read status information. After completing address allocation and configuration recognition, the programmable logic device of the backplane analyzes VPP information, and the backplane lights an LED at the corresponding port, and uploads the information of the position of the hard disk monitored by the backplane to the controller at the same time.

The Oculink connector supports SAS, SATA and PCIe signal links, and each connector supports four SAS and SATA hard disks or one NVMe hard disk. Remaining signal pin in the uplink connector is defined as SGPIO or VPP, and is defined as a PERST # signal and a WAKE # signal in a NVMe support mode. In consideration of an application scenario of a Tri-mode standard add-in card, that is, a daughter card of X8 or X16, the daughter card is compatible with SAS, SATA and NVMe. BP_type and Ctrl_type are defined in an SFF-9402 interface standard, so that the backplane can determine whether the uplink signal controller is from the CPU or the Tri-mode card.

VPP addresses of different PCIE ports of the controller are determined by a register in a VPP index. Specifically, a VPP address of a PCIE port is written into a corresponding VPP index by BIOS.

A CPLD serves as the programmable logic device of the backplane. The CPLD simulates a PCA9555 module circuit. Each PCA9555 module circuit transmits backplane lamp lighting information of two ports, and each port occupies 8 bits of data information. The backplane lamp lighting information of each port includes fault, locate, and present information of the NVMe hard disk. The numbers of bytes occupied by the fault, locate, and present information are 0, 1, and 4 respectively, and remaining bits are reserved.

Further, in the method, eight device addresses currently available for an Intel CPU include: 0x40, 0x42, 0x44, 0x46, 0x4C, and 0x4E. Each CPU has 48 PCIe data lanes in total, and supports 12 disks of NVMe at most. One VPP address is allocated for every two disks. It is required to select six addresses from the eight addresses. Each CPU is connected to a group of VPP signal lines, and the signal lines are connected to the backplane via the connector backplane channel of each port. The Tri-mode card is implemented as a Broadcom Tri-mode card, which supports two specifications. In one specification, a daughter card with an uplink bandwidth of X8 can mount two NVMes, and VPP addresses of the two NVMes are 0x40 and 0x42, both of which use low 8-bit information of the VPP register. In another specification, a daughter card with an uplink bandwidth of X16 can mount 4 NVMes, VPP addresses of the first two NVMes are 0x40, and VPP addresses of the last two NVMes are 0x42.

In the embodiment of the present disclosure, a new NVMe hard disk lamp lighting solution is provided to solve the problem that the previous generation of NVMe hard disk backplane cannot light the Locate lamp, and the new solution is compatible with the CPU and the Tri-mode card master end solution of a new product. VPP address identification and data analysis are added to backplane CPLD program of the hard disk, so that effective data control bits are extracted to correctly light the backplane indicator lamp. The method also solves the design problem of NVMe hard disk backplane, which is of great significance for supporting the configuration of the NVMe hard disk in a new generation of product.

The embodiments described above are only preferred embodiments of the present disclosure, and should not be interpreted as limitation to the present disclosure. Any modifications, improvements and equivalent replacements made by those skilled in the art without departing the principles of the present disclosure fall within the protection scope of the present disclosure.

The invention claimed is:

1. A method for lighting a backplane lamp of a plurality of Non-Volatile Memory Express (NVMe) hard disks, wherein a backplane is connected to a motherboard, a group of Virtual Pin Port (VPP) signal wires are connected to each controller of the motherboard, the VPP signal wires are connected to the backplane via a connector sideband channel of each port, and wherein the method comprises:

transmitting a VPP address to the backplane in a cyclic manner by the controller, and analyzing the address transmitted by the controller by a programmable logic device of the backplane after a data stream transmitted by the controller is received;

transmitting, by the controller, hard disk lamp lighting information of a corresponding disk position to the programmable logic device of the backplane, if a VPP address analyzed by the backplane is the same as the VPP address transmitted by the controller; and performing logical conversion, by the programmable logic device of the backplane, on the hard disk lamp lighting information transmitted by the controller, to convert a serial data stream on the VPP signal wires into a parallel signal, lighting a backplane lamp at a corresponding port, and uploading information of a position of the hard disk monitored by the backplane to the controller.

2. The method for lighting a backplane lamp of a plurality of NVMe hard disks according to claim 1, wherein an Oculink connector serves as a connector of the backplane, a reserved signal pin on the Oculink connector serves as an address line, each port address is defined through an up-down pull resistor at the motherboard end, address line information is read at the backplane end, and the VPP address is allocated for a corresponding channel after the address line information is analyzed by the backplane.

3. The method for lighting a backplane lamp of a plurality of NVMe hard disks according to claim 2, wherein the backplane is provided with a dial switch, a status list of the dial switch is determined by configuration of each NVMe, and the programmable logic device of the backplane determines a type of an uplink controller, a channel for interacting with the controller, and the number of NVMe hard disks based on read status information.

4. The method for lighting a backplane lamp of a plurality of NVMe hard disks according to claim 2, wherein the Oculink connector supports Serial Attached Small Computer System Interface (SAS), Serial Advanced Technology Attachment (SATA) and Peripheral Component Interface Express (PCIe) signal links, each Oculink connector supports four SAS and SATA hard disks or one NVMe hard disk, remaining signal pin in the uplink connector is defined as Serial General Purpose Input/Output (SGPIO) or VPP, and is defined as a PERST # signal and a WAKE # signal in a NVMe support mode.

5. The method for lighting a backplane lamp of a plurality of NVMe hard disks according to claim 1, wherein VPP addresses of different PCIE ports of the controller are determined by a register in a VPP index, and the VPP address of the PCIE port is written into a corresponding VPP index by Basic Input/Output System (BIOS).

6. The method for lighting a backplane lamp of a plurality of NVMe hard disks according to claim 1, wherein a Complex Programmable Logic Device (CPLD) serves as the programmable logic device of the backplane, the CPLD simulates a PCA9555 module circuit, each PCA9555 module circuit transmits backplane lamp lighting information of two ports, and each port occupies 8 bits of data information.

7. The method for lighting a backplane lamp of a plurality of NVMe hard disks according to claim 6, wherein the backplane lamp lighting information of the port comprises fault, locate, and present information of the NVMe hard disk, the numbers of bytes occupied by the fault, locate, and present information are 0, 1, and 4 respectively, and remaining bits are reserved.

* * * * *